United States Patent
Braillard et al.

(10) Patent No.: US 7,128,962 B2
(45) Date of Patent: Oct. 31, 2006

(54) METALLIC MATERIAL THAT CAN BE WORN AWAY BY ABRASION; PARTS, CASINGS, AND A PROCESS FOR PRODUCING SAID MATERIAL

(75) Inventors: Frederic Braillard, Chatellerault (FR); Philippe Perruchaut, Alfortville (FR); Didier Ribot, Dange Saint Romain (FR); Joel Vigneau, Champcueil (FR)

(73) Assignee: Snecma Services, Paris (FR)

(*) Notice: Subject to any disclaimer, the term of this patent is extended or adjusted under 35 U.S.C. 154(b) by 15 days.

(21) Appl. No.: 10/461,400

(22) Filed: Jun. 16, 2003

(65) Prior Publication Data

US 2004/0023056 A1    Feb. 5, 2004

(30) Foreign Application Priority Data

Jun. 14, 2002  (FR) ................... 02 07339

(51) Int. Cl.
  B32B 3/00    (2006.01)
  B32B 15/04   (2006.01)
  B32B 3/26    (2006.01)

(52) U.S. Cl. ............... 428/141; 428/143; 428/304.4; 428/698; 428/469; 428/323

(58) Field of Classification Search ........... 428/469, 428/679, 680, 570, 697, 698, 701, 702, 550, 428/323, 304.4, 141, 143, 155, 699
See application file for complete search history.

(56) References Cited

U.S. PATENT DOCUMENTS 3,084,064 A * 4/1963 Cowden et al. ........... 428/639
4,377,371 A    3/1983 Wisander et al.
4,423,097 A * 12/1983 Mons et al. ............... 427/451
4,546,047 A   10/1985 Ryan
4,884,820 A * 12/1989 Jackson et al. ............ 277/415
5,185,217 A *  2/1993 Miyamoto et al. ........ 428/627
5,434,210 A *  7/1995 Rangaswamy et al. .... 524/406
5,601,933 A *  2/1997 Hajmrle et al. ........... 428/660
5,780,116 A *  7/1998 Sileo et al. ............... 427/456
5,834,387 A * 11/1998 Divakar et al. ............ 501/88
5,976,695 A * 11/1999 Hajmrle et al. ........... 428/402
5,998,318 A * 12/1999 Takanami et al. ......... 501/90
6,074,706 A *  6/2000 Beverley et al. .......... 427/454
6,528,189 B1 *  3/2003 Beele ....................... 428/698
6,703,137 B1 *  3/2004 Subramanian ............. 428/469
2004/0086414 A1* 5/2004 Lim et al. ................. 419/36

FOREIGN PATENT DOCUMENTS

| EP | 0 751 104 A2 | 1/1997 |
| FR | 2.223.473 | 10/1974 |
| WO | WO 02/20426 | 3/2002 |

* cited by examiner

*Primary Examiner*—Jennifer C. McNeil
*Assistant Examiner*—Gordon R. Baldwin
(74) *Attorney, Agent, or Firm*—Oblon, Spivak, McClelland, Maier & Neustadt, P.C.

(57) ABSTRACT

A material that can be worn away by abrasion, and a method of making the same, includes a substantially oxide free metal alloy based on nickel or cobalt or a ceramic. The material further includes at least one of particles of solid lubricant, closed pores, or surface recesses. The material can be used to make parts, in particular plates, and casings, the inner surface of which is at least partially covered with plates of this material.

64 Claims, 1 Drawing Sheet

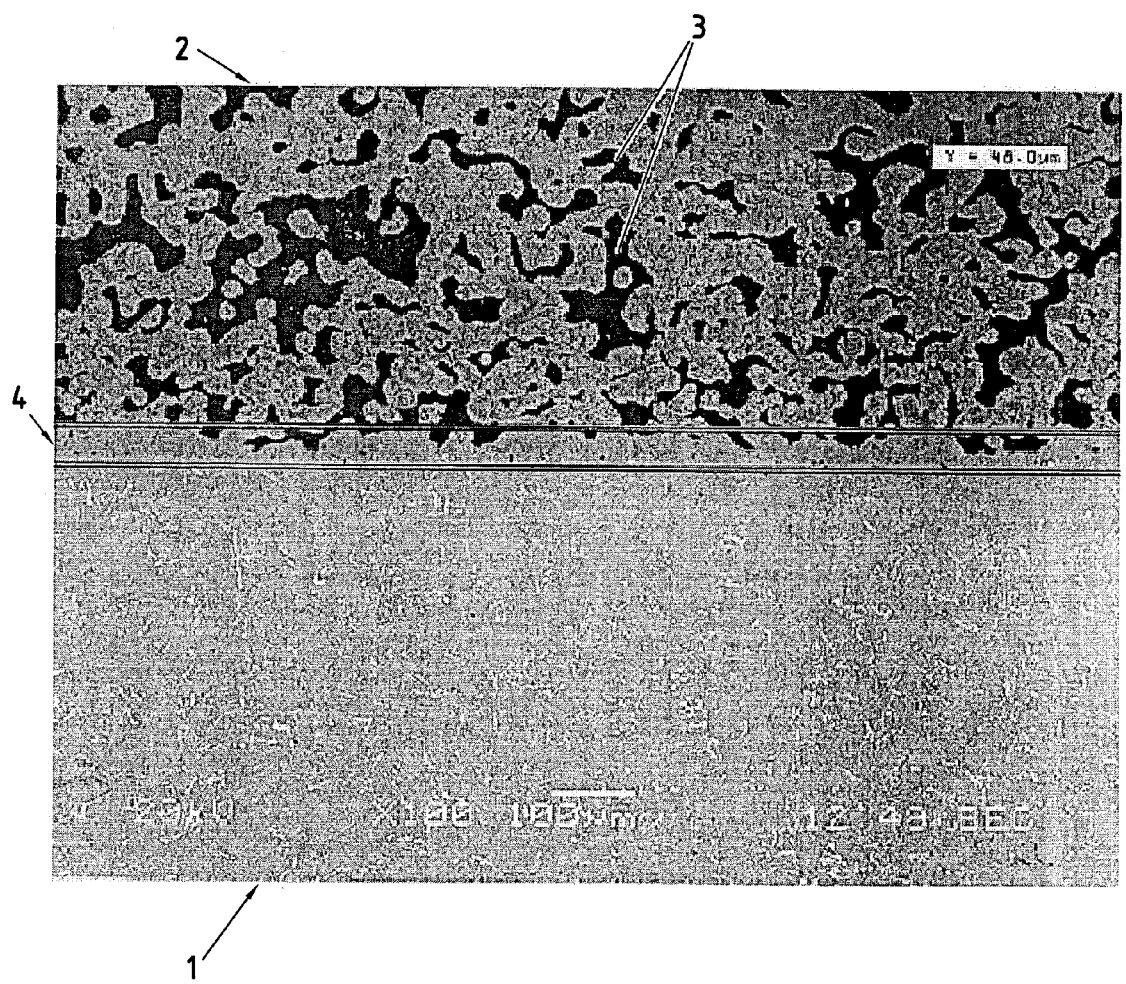

METALLIC MATERIAL THAT CAN BE WORN AWAY BY ABRASION; PARTS, CASINGS, AND A PROCESS FOR PRODUCING SAID MATERIAL

The present invention relates to:
a novel type of metallic material that can be worn away by abrasion;
parts, in particular plates, formed from said material;
casings, the inner surfaces of which are at least partially covered with said plates;
a process for producing said material.

The present invention pertains to the field of abradable metallic materials. The skilled person speaks so of metallic materials that can be worn away by abrasion.

BACKGROUND OF THE INVENTION

That type of material is desirable, in particular for positioning on the inner surfaces of casings in which revolving parts are turning (of the compressor or turbine blade type, for example). Said material can be worn away by the extremities of said revolving parts when interference occurs. Thus, the deleterious effects of said interference are minimized both as regards the structure of said extremities of said revolving parts, and as regards said inner surfaces of said casings.

That type of material advantageously has the following specifications:
clearly, it has to have good abradability;
it must also be resistant to the temperature of the media into which they are incorporated (500° C. to 1200° C., for example, inside the casings of aircraft engines);
it must also resist erosion by repeated strikes from abrasive particles (detached during the interference mentioned above);
its production costs and assembly costs must also be as low as possible;
finally, it is preferably also self-brazing.

Two types of abradable metallic materials have principally been proposed in the prior art: those generated in situ by projecting (plasma, . . . ) hot metal powders and those with a honeycomb structure which are transferred to and brazed onto the surfaces to be protected.

Those two types of abradable metallic metals are not completely satisfactory, in particular as regards the above specifications.

The first type is associated with a projection technique that is expensive both as regards the projection time and as regards the need for machining following projection, in order to control the thickness of the projected deposit.

The second type has a limited field of application. It is only suitable for wipers for labyrinth seals or for shrouded blades.

French patent application number FR-A-2 223 473 describes porous seals (the porosity in question is an open porosity), consisting of a nickel alloy (nickel is always the major constituent (by weight)) which includes oxides (intentionally formed during the second principal step of the process for producing said alloy). Said nickel alloy can include boron nitride. The alloy fills honeycomb structures.

OBJECTS AND SUMMARY OF THE INVENTION

In such a context, the inventors of the invention as presently claimed have designed and developed a novel abradable metallic material which satisfies the above specifications. Said material constitutes the invention in its first aspect. Its use in the form of parts, and in particular as plates, more particularly intended to cover the inner surface of casings, constitutes a second aspect of said invention. Its production process constitutes a third aspect of the invention. Compared with the prior art mentioned above, said material is entirely original and, with regard to the specifications mentioned above, particularly effective.

In a first aspect, the invention thus provides a metallic material that can be worn away by abrasion (an abradable material) of a novel type. Said material principally consists of an alloy based on nickel and/or cobalt which is (quasi) free of oxide or of a ceramic; said metal alloy or said ceramic having:
particles of solid lubricant distributed through its volume, in an amount that is 10% by volume or more; and/or
closed pores distributed through its volume, said pores endowing said material with a porosity that is less than a percolation threshold; and/or
recesses distributed in its surface, the walls of which are intended to undergo wear by abrasion.

The material of the invention associates a specific nature (a metal alloy based on Ni and/or Co (quasi) free of oxide, or a ceramic) with means endowing it with the desired abradability (particles of lubricant in an effective quantity, with closed pores and/or recesses in their structure). These means are suitable for obtaining or optimizing the desired result, when employed alone or in combination.

The particles of solid lubricant render the material abradable by modifying its composition or its intrinsic nature, while the internal pores and surface recesses render it abradable by modifying its physical condition (the volume of the material involved in interference is limited, and thus the deleterious effect of that interference is limited).

Advantageously, particles of solid lubricant and pores are associated in the bulk of the material of the invention. Highly advantageously, particles of solid lubricant, pores, and recesses are respectively associated in the bulk of said material and at the surface intended to undergo wear by abrasion.

The solid lubricant, which can be used in the form of particles in the matrix of the novel material of the invention, must clearly be stable at the production and service temperatures of said material. It must remain intact and operational, and in particular it must not react with the material in which it is employed. In any case, it must be and remain suitably compatible with the metal alloy or the ceramic in which it is employed in a reasonable quantity.

It must also be used in a form that is compatible with the process for producing the material of the invention (see below). It can be in a pre-conditioned, pre-agglomerated, pre-alloyed state . . .

The pores, which can be used in the matrix of the novel material of the invention, are always used in a reasonable quantity endowing said material with a closed porosity that is below a percolation threshold. Said material must not be unduly embrittled and direct access to said surface must not be created as it is employed to protect a surface.

When recesses are arranged on the surface of the material of the invention, they are clearly present in a suitable manner as regards their size and density.

The above comments prioritize the advantages associated with combining at least two of the three means above, which can endow the material with the desired abradability.

In a first variation, the material of the invention is based on an alloy of nickel and/or cobalt. Said alloy mainly comprises nickel, cobalt or a combination of nickel and cobalt, by weight.

The alloy in question is advantageously of the NiCrAl type or of the MCrAlY type, in which M=Ni and/or Co.

The alloy in question is not oxidized. It is obtained after sintering carried out in a non-oxidizing atmosphere (see description of the process below). The presence of oxide(s) is prejudicial as said oxides are capable of providing the material with an abrasive nature (which abrasive nature is deleterious to the desired self-lubricating properties). It would only result from unsatisfactory operating conditions and in any case remains minimal.

In a second variation, the material of the invention is based on a ceramic. The ceramic in question is advantageously a ceramic based on zirconia ($ZrO_2$), alumina ($Al_2O_3$) or silicon carbide (SiC).

With reference to the first—the particles of solid lubricant—of the three means defined above, which means can endow the material in question with abradability, the following statements can be made.

Said solid lubricant particles generally have an equivalent diameter (the particles can be spherical or angular) in the range 5 micrometers (μm) to 100 μm. They are advantageously uniformly distributed in the bulk of the material. They are advantageously isolated.

However, it is also possible for them to be grouped in small colonies. Such colonies must clearly remain small in order for the material to remain homogeneous. Said small colonies can have an equivalent diameter of at most 200 μm.

The skilled person will readily appreciate that implementing the process for manufacturing the material of the invention must be optimized in order to minimize or avoid the formation of said colonies or agglomerates.

Said particles of solid lubricant are used in an amount of 10% or more by volume in the material in question. Clearly, they are used in the quantity ($\geq$10% by volume) needed to obtain the anticipated effect (to render the material abradable) but also in a quantity (generally $\leq$40% by volume) that does not drastically affect the mechanical properties of the material. Said particles of solid lubricant are advantageously used in an amount that is in the range 20% to 30% by volume.

Said particles of solid lubricant generally consist of particles of boron nitride (BN) or graphite. Said two types of particles can be used in a matrix formed from a ceramic or from an alloy based on cobalt containing no nickel. In alloys comprising nickel, the use of particles of boron nitride must be avoided as there is a severe problem with compatibility: nickel can react with boron.

Regarding the second—the closed pores—of the three means described above, which means can endow the material in question with abradability, the following statements can be made.

Said pores are closed and endow the material with a porosity that is below a percolation threshold. Thus, they do not unduly embrittle said material and do not allow leakage through the thickness of said material.

Said closed pores advantageously have an equivalent diameter in the range 10 μm to 150 μm, highly advantageously in the range 50 μm to 100 μm.

Generally, the porosity with which said material is endowed represents 10% to 50% of its volume.

Regarding the third—the surface recesses—of the three means described above, which means can endow the material in question with abradability, the following statements can be made.

Advantageously, the equivalent diameter of said recesses is in the range 0.5 millimeters (mm) to 3 mm. Said recesses generally occupy at least 40% of the surface area.

With reference to the above description, regarding the extent of the involvement of one or other of the three means, it can be stated that this clearly depends on the mode of use of the means in question, used alone or in combination with one and/or both other means. The effects of each of said means with respect to the desired effect are additive.

In an advantageous variation, the abradable material of the invention is also self-brazable. It includes an effective quantity of particles of brazing material. Said effective quantity is generally 1% to 10% by weight. A non-limiting example of the grain size of said particles is an equivalent diameter generally in the range 1 μm to 50 μm.

Said particles advantageously consist of silicon particles. They can also be boron particles. In a material of the invention, silicon particles and boron particles can be used. However, it should be remembered that boron can react with nickel. Thus, boron particles are not used in materials of the invention that are based on a metal alloy comprising nickel. Clearly, they can be used in materials of the invention based on a ceramic or an alloy based on cobalt containing no nickel.

The use of particles of brazing material in the material of the invention renders the material of the invention even more advantageous for its subsequent use. Said use in the process for producing a porous material requires a particular command and control of the process which, however, lies within the purloin of the skilled person.

The skilled person will doubtless appreciate all the advantages of the material of the invention from the above description.

The material of the invention can be obtained using powder metallurgy techniques. A process for producing said material based on said techniques will now be described.

In a second aspect, the present invention concerns, as indicated above, the use of the material described above, constituting the first aspect of the invention. More precisely, it concerns:

parts, in particular plates, which may be flat or curved, formed from said material; and casings intended to contain revolving parts at high temperatures, the inner surfaces of which are at least partially covered (protected by) said plates, which are affixed to said inner surfaces by brazing or self-brazing.

The parts in question are generally plates intended to be affixed to said surfaces. However, the scope of the invention also encompasses the possibility that said parts have other shapes and/or are used in structures other than the casings mentioned above.

The casings in question are advantageously those comprising high pressure compressors, low pressure turbines, or high pressure turbines, in the structure of aircraft engines.

Said casings are generally cylindrical in shape; said inner surfaces are coated with curved plates with a suitable radius of curvature.

The plates are fixed to the inner surface of the casings by brazing, advantageously self-brazing if said plates include a suitable quantity of brazing material in their structure.

We shall now turn to the third aspect of the invention, namely a process for producing a novel abradable material as described above. Said process comprises:

forming an intimate mixture of a powder of the metal alloy or the ceramic in question and an organic binder; said intimate mixture optionally additionally including an effective quantity of particles of solid lubricant and/or particles of a brazing material;

molding said mixture by pressing or injection into a mold which optionally exhibits protuberances that can generate surface recesses;

extracting the molded blank from said mold;

unbinding said unmolded blank;

at least partial densification by sintering of said blank following unbinding; said densification being carried out in a non-oxidizing atmosphere for the blank based on a metal alloy;

the particles of solid lubricant and/or the mold protuberances and/or carrying out partial sintering endowing the material with the desired abradability (respectively via said particles of solid lubricant and/or the surface recesses obtained by dint of said protuberances and/or the pores resulting from said partial sintering); the particles of brazing material, if used, rendering it self-brazable.

The powder(s) used—a powder of the metal alloy powder or the ceramic in question, particles of solid lubricant and/or optional particles of brazing material—can be spherical or angular in shape, depending on their mode of manufacture, so that they facilitate shape retention and densification during the subsequent steps of the process.

The powders may or may not have been pre-alloyed. When graphite is used as the solid lubricant, they have to be pre-agglomerated so as to mix properly with the powder of the metal alloy or the ceramic in question and the binder.

The powder of the metal alloy or the ceramic is a precursor for the matrix; it provides the mechanical strength of the ensemble. The equivalent diameter of its grains is advantageously in the range 10 μm to 70 μm for metal alloy grains (based on nickel and/or chromium), and the equivalent diameter is in the range 1 μm to 20 μm for ceramic grains (for example based on $ZrO_2$, $Al_2O_3$ or SiC).

The particles of solid lubricant, when used, provide at least partial abradability. They are generally used in an amount indicated above in the present text ($\geq 10\%$ by volume of the final material), at the grain size indicated above in the present text (equivalent diameter in the range 5 μm to 100 μm). Said particles can in particular comprise grains of boron nitride (when there is no compatibility problem with nickel) and/or grains of graphite coated with metal. They can in particular comprise grains of boron nitride with an equivalent diameter in the range 5 μm to 30 μm and/or coated grains of graphite with an equivalent diameter in the range 30 μm to 90 μm. The coating employed is clearly compatible with the matrix into which the grains of solid lubricant are to be incorporated.

When used in an effective quantity, the particles of brazing material provide the finished material with its self-brazable nature. We saw above that said effective quantity is generally in the range 1% to 10% by weight, that said particles generally have an equivalent diameter in the range 1 μm to 50 μm, and that silicon is preferred as the brazing material.

The organic binder employed is conventional, for example of the wax+polymer (more particularly polypropylene) type.

The intimate mixture of the powder, any particles that are present and the binder is advantageously produced as follows:

mixing the powder, any particles that are present (cold pre-mixed) and binder at a temperature in the range 150° C. to 200° C. At this temperature, the binder used must have a suitable viscosity;

cooling said mixture until it solidifies;

grinding said solidified mixture.

The intimate mixture produced—advantageously obtained in the form of a ground mixture—is then molded to the desired shape (usually a plate, which may be flat or curved). It can be pressed or injected into a suitable mold which, if necessary, exhibits protuberances and which reproduces said desired shape on a scale that is greater than 1 (to compensate for shrinkage during the subsequent densification steps). Said mold advantageously comprises a jacket to heat or cool the molded mixture, to simplify filling said mold, setting of the binder and/or unmolding. Said molding step can produce the desired geometry of the part. If the mold used has protuberances, it can generate recesses on the surface of the molded part.

The molding operation is advantageously carried out by injection ("metal injection molding"), for example under the following conditions: a temperature in the range 150° C. to 200° C., for 15 seconds to 60 seconds.

Said molding operation is conventionally followed by unmolding and unbinding operations.

Unbinding is clearly adapted to the nature of the binder in use. It is advantageously carried out in two steps. In accordance with this advantageous variation, it comprises in succession:

a first, chemical, treatment, which is aimed to remove the binder from the molded part obtained by unmolding, creating within it a network of micro-channels. Said first chemical treatment can be with hexane (a solvent for the binder) in the liquid phase and then in the vapor phase;

a second, heat, treatment, which completes and finalizes the unbinding begun chemically. Said second heat treatment is generally carried out between 110° C. and 450° C. (advantageously with a slow temperature rise) using a suitable protective gas (a reducing atmosphere, for example hydrogen). Said second heat treatment, which finishes the unbinding, is advantageously continued to pre-sinter the part. The pre-sintering temperatures are generally in the range 500° C. to 1200° C. By carrying out said pre-sintering, the molded part is endowed with integrity. The heat treatment can comprise a plurality of cycles lasting 10 to 50 hours. It is in all cases adapted to the nature of the material being used and to the thickness of the molded part.

The final step consists of completely or partially densifying the unmolded part. Partial densification by partial sintering is intended to generate pores within the final material. It has been seen that porosity can be desirable as regards the desired abradability. It may be superfluous if abradability resides in the use of particles of solid lubricant and/or in the presence of surface recesses. The skilled person will be able to control the sintering carried out as a function of the anticipated porosity, in particular by controlling the rates of temperature rise and fall, the constant temperature period and the threshold temperature. The sintering temperature range is generally 1100° C. to 1500° C., more frequently 1100° C. to 1350° C.

Sintering is carried out in a non oxidizing atmosphere, generally in vacuo or at a low partial pressure of a gas (argon or hydrogen, for example. The use of hydrogen is particularly recommended in order to avoid any oxidation) that is protective in the context of producing a material based on a metal alloy. In the context of producing a ceramic-based material, this can be carried out in an oxidizing or non-oxidizing atmosphere.

This final step for densifying the material obtained—from the unmolded part—can be carried out both directly on said material, unmolded and cooled (advantageously pre-sintered in the mold) and on said material already affixed to a support. In this second hypothesis, densification and brazing or self-brazing of said material can be carried out on the support in succession.

The process described above is analogous to a powder metallurgy process modified by at least one novel aspect of the implementation concerning the nature of the material to be molded and/or the shape of the mold and/or the final densification step.

BRIEF DESCRIPTION OF THE DRAWING AND THE EXAMPLE

We shall now provide non-limiting illustrations of the principal aspects of the invention (product, process) with reference to:
the attached FIGURE;
the example below.

Said FIGURE is a photographic image of a material of the invention (magnification 100) brazed onto a KC24NWTa (MarM 509) metal substrate. Said material—non oxidized CoNiCrAlY alloy rendered self-brazable by Si particles—can be worn by abrasion due to its porosity. The pores are homogeneously distributed; their volume fraction is about 30%. The following are shown:
reference numeral 1 designates the plate onto which the material of the invention has been self-brazed;
reference numeral 2 shows said material of the invention;
reference numeral 3 shows closed pores (black zones) in the structure of said material;
reference numeral 4 shows the brazing zone.

MORE DETAILED DESCRIPTION OF THE DRAWING AND THE EXAMPLE

Said material of the invention was obtained as will be described in the example below.

EXAMPLE

In a first step, two metal powders were simply mixed to provide an intimate mixture. Said mixing could also have been carried out by mechanosynthesis. The powders in question were:
a CoNiCrAlY powder (% by weight: Co 38%, Ni 32%, Cr 22%, Al 7.5%, Y 0.5%) the grains of which had an equivalent diameter of 35 μm, constituting 98% of the weight;
a silicon powder with grains with an equivalent diameter of 10 μm, used in an amount of 2% by weight.

An organic binder constituted by wax and polypropylene was then added to said intimate mixture. Said binder was used in an amount of 35% by volume for 65% by volume of the mixture of powders.

It was heated to 180° C. to produce a perfectly homogeneous paste.

It was then cooled, chopped and finally ground to generate a granulate.

The granulate obtained was introduced into the injection molding machine and heated to 180° C.

The heated mixture was then injected into the cavity of a metal mold with a suitable shape (a plate).

After 1 minute, said mold was opened and the molded part was removed.

Unbinding was carried out in two steps in hydrogen. The first step was a chemical step, reacting with hexane until almost all of the wax had been removed. In a second step, the polypropylene was pyrolyzed in a hydrogen atmosphere. The temperature was raised slowly then kept at 400° C. for 2 hours.

After this temperature stage at 400° C., said temperature was slowly raised to 1000° C. It was kept at this level for 10 minutes, to pre-sinter the molded part. This pre-sintering cycle (in hydrogen) lasted 32 hours.

The pre-sintered part was cooled.

It was then positioned on the support by attaching with spot welds.

On its support, it was then heat treated in vacuo to bring about partial densification (to generate a porous material) and self-brazing.

The temperature was then taken to 1260° C. for 2 hours to bring about controlled partial densification, then left for 1 hour at a first constant temperature stage of 1180° C., 1 hour at a second constant temperature stage of 1160° C., to allow diffusion into the material support.

The porosity of the final part, which was affixed to its support, can clearly be seen in the accompanying FIGURE.

What is claimed is:

1. A casing intended to contain revolving parts at high temperatures, wherein inner surfaces of said casing are at least partially covered with plates made with a material affixed to said inner surfaces by brazing or self-brazing, wherein said material comprises:
a metal alloy based on at least one of nickel or cobalt, the metal alloy being substantially free of oxide and comprising protrusions separated by recesses arranged on a surface of said metal alloy, wherein walls of said recesses are configured to wear by abrasion.

2. A process for producing a material capable of being worn by abrasion, comprising:
forming an intimate mixture of a powder of a metal alloy or a ceramic and an organic binder;
molding said mixture by pressing or injection into a mold;
extracting the molded blank from said mold;
unbinding said blank; and
at least partial densification by sintering of said blank following unbinding, said densification being carried out in a non-oxidizing atmosphere for the blank based on a metal alloy, wherein at least one of particles of solid lubricant, molded protuberances, or said at least partial densification by sintering endows the material with the desired abradability,
wherein said mold further comprises protuberances configured to generate surface recesses.

3. The process according to claim 2, wherein said intimate mixture further comprises an effective quantity of particles of a brazing material so as to render the material self-brazable.

4. The process according to claim 2, wherein said intimate mixture further comprises an effective quantity of particles of solid lubricant.

5. The process according to claim 2, wherein said sintering is performed in a vacuum.

6. The process according to claim 2, wherein said non-oxidizing atmosphere comprises hydrogen.

7. The process according to claim 2, wherein said forming comprises forming an intimate mixture of the metal alloy powder and the organic binder.

8. The process according to claim 7, wherein said metal alloy powder comprises grains with an equivalent diameter ranging from 10 µm to 70 µm.

9. The process according to claim 2, wherein said forming comprises forming an intimate mixture of the ceramic powder and the organic binder.

10. The process according to claim 9, wherein said ceramic powder comprises grains with an equivalent diameter ranging from 1 µm to 20 µm.

11. A material that can be worn away by abrasion, the material comprising:
   a metal alloy based on at least one of nickel or cobalt, the metal alloy being substantially free of oxide and comprising protrusions separated by recesses arranged on a surface of said metal alloy, wherein walls of said recesses are configured to wear by abrasion;
   wherein said metal alloy comprises particles of solid lubricant distributed through a volume of said metal alloy in an amount that is 10% by volume or more.

12. The material according to claim 11, wherein an equivalent diameter of said particles of solid lubricant ranges from 5 µm to 100 µm.

13. The material of claim 12, wherein the range of equivalent diameter of the particles of solid lubricant is between 5 and 30 µm.

14. The material according to claim 11, wherein said particles of solid lubricant comprise particles of boron nitride (BN) or graphite, said boron nitride (BN) not being used in a metal alloy containing nickel (Ni).

15. The material according to claim 11, wherein an equivalent diameter of said surface recesses ranges from 0.5 mm to 3 mm.

16. A part formed from a material according to claim 11.

17. The part according to claim 16, wherein said part is a flat plate.

18. The part according to claim 16, wherein said part is a curved plate.

19. The material of claim 11, wherein said recesses are molded recesses.

20. The material of claim 11, wherein said particles of solid lubricant are uniformly distributed in the material.

21. The material of claim 20, wherein said particles of solid lubricant are isolated from each other.

22. The material of claim 11, wherein the amount of said particles of solid lubricant is less than 40% by volume.

23. The material of claim 11, wherein the amount of said particles of solid lubricant ranges between 20 and 30% by volume.

24. The material of claim 11, wherein the recesses occupy less than 40% of the surface of the material.

25. The material of claim 11, wherein the particles of solid lubricant are metal coated graphite particles.

26. The material of claim 25, wherein an equivalent diameter of said particles of solid lubricant ranges between 30 and 90 µm.

27. The material according to claim 11, wherein said metal alloy is an NiCrAl metal alloy or a MCrAlY metal alloy in which M=Ni or Co.

28. A material that can be worn away by abrasion, the material comprising:
   a metal alloy based on at least one of nickel or cobalt, the metal alloy being substantially free of oxide and comprising protrusions separated by recesses arranged on a surface of said metal alloy, wherein walls of said recesses are configured to wear by abrasion;
   wherein said metal alloy comprises closed pores distributed through a volume of said metal alloy, said pores endowing said material with a porosity that is less than a percolation threshold.

29. The material according to claim 28, wherein an equivalent diameter of said closed pores ranges from 10 µm to 150 µm.

30. The material of claim 29, wherein the range of equivalent diameter of the closed pores is between 50 and 100 µm.

31. The material according to claim 28, wherein the porosity of said metal alloy is 10% to 50% by volume.

32. The material according to claim 28, wherein said metal alloy is an NiCrAl metal alloy or a MCrAlY metal alloy in which M=Ni or Co.

33. A material that can be worn away by abrasion, the material comprising:
   a metal alloy based on at least one of nickel or cobalt, the metal alloy being substantially free of oxide and comprising protrusions separated by recesses arranged on a surface of said metal alloy, wherein walls of said recesses are configured to wear by abrasion;
   wherein said metal alloy comprises particles of a brazing material in an effective quantity, such that the material is self-brazable;
   wherein an equivalent diameter of said brazing material is between 1 and 50 µm.

34. The material according to claim 33, wherein said brazing material comprises at least one of silicon (Si) or boron (B).

35. The material of claim 33, wherein the effective quantity is in the range of 1 to 10% by weight.

36. A material that can be worn away by abrasion, the material comprising:
   a metal alloy based on at least one of nickel or cobalt, the metal alloy being substantially free of oxide and comprising:
   particles of solid lubricant distributed through a volume of said metal alloy in an amount that is 10% by volume or more; and
   closed pores distributed through the volume of said metal alloy, said pores endowing said material with a porosity that is less than a percolation threshold.

37. The material according to claim 36, wherein said metal alloy comprises protrusions separated by recesses arranged on the surface of said metal alloy, wherein the walls of said recesses are configured to wear by abrasion.

38. The material according to claim 37, wherein said metal alloy is an NiCrAl metal alloy or a MCrAlY metal alloy in which M=Ni or Co.

39. A casing intended to contain revolving parts at high temperatures, wherein inner surfaces of said casing are at least partially covered with plates made with the material of claim 37 affixed to said inner surfaces by brazing or self-brazing.

40. The material according to claim 36, wherein said metal alloy is an NiCrAl metal alloy or a MCrAlY metal alloy in which M=Ni or Co.

41. A casing intended to contain revolving parts at high temperatures, wherein inner surfaces of said casing are at least partially covered with plates made with the material of claim 36 affixed to said inner surfaces by brazing or self-brazing.

42. A casing intended to contain revolving parts at high temperatures, wherein inner surfaces of said casing are at least partially covered with plates made with a material affixed to said inner surfaces by brazing or self-brazing, the material being configured to be worn away by abrasion and comprising:

a ceramic comprising at least one of:
particles of solid lubricant distributed through a volume of said ceramic in an amount that is 10% by volume or more;
closed pores distributed through the volume of said ceramic, said pores endowing said material with a porosity that is less than a percolation threshold; or
protrusions separated by recesses arranged on a surface of said ceramic, wherein said material is molded and walls of said recesses are configured to wear by abrasion, and wherein said material is molded;
wherein the ceramic comprises protrusions separated by recesses arranged on the surface of said ceramic, wherein said material is molded and the walls of said recesses are configured to wear by abrasion.

43. The casing according to claim 42, wherein the ceramic comprises particles of solid lubricant distributed through the volume of said ceramic in the amount that is 10% by volume or more.

44. A material capable of being worn away by abrasion, comprising:
a ceramic comprising closed pores distributed through the volume of said ceramic, said pores endowing said material with a porosity that is less than a percolation threshold, wherein said material is molded;
wherein said ceramic comprises particles of solid lubricant distributed through a volume of said ceramic in an amount that is 10% by volume or more; and
wherein the particles of solid lubricant are metal coated graphite particles.

45. The material according to claim 44, wherein an equivalent diameter of said particles of solid lubricant ranges from 5 μm to 100 μm.

46. The material of claim 45, wherein the range of equivalent diameter of the particles of solid lubricant is between 5 and 30 μm.

47. The material according to claim 44, wherein said particles of solid lubricant comprise particles of boron nitride (BN) or graphite, said boron nitride (BN) not being used in a metal alloy containing nickel (Ni).

48. The material according to claim 44, wherein an equivalent diameter of said closed pores ranges from 10 μm to 150 μm.

49. The material of claim 48, wherein the range of equivalent diameter of the closed pores is between 50 and 100 μm.

50. The material according to claim 44, wherein the porosity of said ceramic is 10% to 50% by volume.

51. The material according to claim 44, wherein said ceramic comprises particles of a brazing material in an effective quantity, such that the material is self-brazable.

52. The material according to claim 51, wherein said brazing material comprises at least one of silicon (Si) or boron (B).

53. The material of claim 51, wherein the effective quantity is in the range of 1 to 10% by weight.

54. The material of claim 51, wherein an equivalent diameter of said brazing material is between 1 and 50 μm.

55. A part formed from a material according to claim 44.

56. The part according to claim 55, wherein said part is a flat plate.

57. The part according to claim 55, wherein said part is a curved plate.

58. The material of claim 44, wherein said particles of solid lubricant are uniformly distributed in the material.

59. The material of claim 58, wherein said particles of solid lubricant are isolated from each other.

60. The material of claim 44, wherein the amount of said particles of solid lubricant is less than 40% by volume.

61. The material of claim 44, wherein the amount of said particles of solid lubricant ranges between 20 and 30% by volume.

62. The material of claim 44, wherein an equivalent diameter of said particles of solid lubricant ranges between 30 and 90 μm.

63. The material according to claim 44, wherein said ceramic is based on zirconia ($ZrO_2$), alumina ($Al_2O_3$), or silicon carbide (SiC).

64. A casing intended to contain revolving parts at high temperatures, wherein inner surfaces of said casing are at least partially covered with plates made with the material of claim 44 affixed to said inner surfaces by brazing or self-brazing.

* * * * *